United States Patent

Schoonman

[11] 3,892,867
[45] July 1, 1975

[54] READILY SEPARABLE INSTANT BEVERAGE CHARGE

[76] Inventor: Marten Leonard Schoonman, 906 N. Elam Ave., Greensboro, N.C. 27408

[22] Filed: Feb. 7, 1974

[21] Appl. No.: 440,611

[52] U.S. Cl. .................... 426/93; 206/499; 426/89; 426/103; 426/147; 426/193; 426/274
[51] Int. Cl. ............................ A23f 1/08; A23f 3/00
[58] Field of Search .......... 426/115, 112, 120, 108, 426/106, 77, 78, 79, 93, 89, 103, 147, 190, 193, 272, 274; 206/46 P, 46 F

[56] References Cited
UNITED STATES PATENTS

| | | | |
|---|---|---|---|
| 2,791,324 | 5/1957 | Knoop et al. ................ | 426/79 X |
| 3,236,369 | 2/1966 | Moore ........................... | 206/519 X |

Primary Examiner—Frank W. Lutter
Assistant Examiner—Steven L. Weinstein
Attorney, Agent, or Firm—Sughrue, Rothwell, Mion, Zinn & Macpeak

[57] ABSTRACT

An instant beverage charge takes the form of a stack of separable, compressed powder, wafers comprising water soluble comestibles such as powdered instant coffee, powdered milk and powdered sugar, with the wafers being readily detachable from each other to vary the contents of the beverage when one or more wafers are added to a measured quantity of water.

2 Claims, 2 Drawing Figures

READILY SEPARABLE INSTANT BEVERAGE CHARGE

BACKGROUND OF THE INVENTION

1. Field of the Invention

This invention relates to the instant beverage field, and more particularly to a comestible beverage charge to be mixed with water and which may be readily varied to meet individual tastes.

2. Description of the Prior Art

"Instant coffee" and "instant tea" have been marketed in packages whose content volume corresponds to that necessary to form a cup of such beverage. Generally, the instant coffee or instant tea takes the form of a fine powder and is carried within a paper or like material package, envelope, or the like. The beverage is preapred by tearing off a corner of the envelope, pouring the powdered coffee or tea into a cup and adding hot or cold water thereto. Additionally, the milk or sugar in powdered form may be readily added thereto from additional and separate paper packets carrying premeasured quantities to allow the drinker to have coffee or tea treated to his own taste.

However, to effect the beverage in final form, it is necessary to add powdered or like comestible material from three different packets in order to produce coffee or tea with cream and sugar. This is time consuming and in addition because of the nature of the powdered comestibles, and in particular, the powdered coffee or tea tends to float to the top of the cup requiring extensive stirring to insure intermixing of all comestibles with the water.

Attempts have been made to provide beverage comestibles such as coffee in pellet or wafer form by compressing the powdered material for use on a cup by cup basis, or in the form of larger pellets or wafers for use in a coffee percolator or the like to produce multiple cups quantities. U.S. Pat. No. 1,137,265 to Robert Hubner is exemplary thereof.

Further, in terms of producing instant coffee or instant tea by the cup, attempts have been made to provide a multiple comestible charge permitting in a single package, powdered comestibles such as sugar, cream and coffee to be added to a predetermined volume of water either hot or cold to produce the desired beverage. U.S. Pat. No. 3,278,448 to Gerhart R. Sommer employs a hollow cylindrical container which carries within the container and separated by transverse layers of a liquid dissolvable material, loose powdered quantities of the various comestibles. The bottom of the cylindrical container is also formed of a water soluble material such as gelatin. By dipping of the tubular container into a cup of water, the comestibles are added to the water, one by one, depending upon the extent of emersion relative to the gelatin cylinder bottom and partitions.

Such an arrangement is unsatisfactory due to the necessity of dipping the container fully into the liquid (including the fingers of the person preparing the beverage), the necessity of discarding the cylindrical container after dispensing and mixing of the charge, and the inability to select from the various comestibles given ones thereof to meet the taste needs of the drinker, due to the fixed nature of the prepared powdered comestible material layers.

SUMMARY OF THE INVENTION

The present invention is directed to water soluble "instant" beverage charge of the type where the charge is added to water to form the beverage and wherein the beverage charge comprises measured portions of at least one comestible such as powdered coffee or tea and at least one other comestible such as powdered milk or sugar. The improvement resides in each comestible taking the form of a compressed powdered wafer with the wafers being detachably stacked together and whereby the content of the liquid beverage may be readily varied by separating selected wafers from the stack to form the charge, or to be removed therefrom, prior to dropping the selected wafer or wafers into the water.

Preferably, the wafers comprise annular discs whose peripheral edges are beveled to provide ready water access to maximum surface area of the multiple wafers of the stack when added to water. The wafers may be attached to each other under applied pressure or may be joined by a water soluble adhesive, but permitting mechanical separation prior to being added to the water. A heat sealed, water soluble transparent film cover, such as polyvinyl alcohol film, may envelop the stack permitting the stack without removal of the film envelope to be added to water, thus insuring the purity of the wafers.

Each stack may comprise at least one powdered coffee, powdered milk and powdered sugar wafer. Preferably, a powdered coffee wafer has attached to respective sides thereof, a milk and a sugar wafer permitting the beverage to comprise coffee alone by separation of both the sugar and cream wafers therefrom, prior to dropping the coffee wafer into the cup of water, or alternatively, either the cream or sugar wafer may be removed to provide a coffee with sugar or a coffee with cream, beverage.

DESCRIPTION OF THE PREFERRED EMBODIMENT

Figure 1:
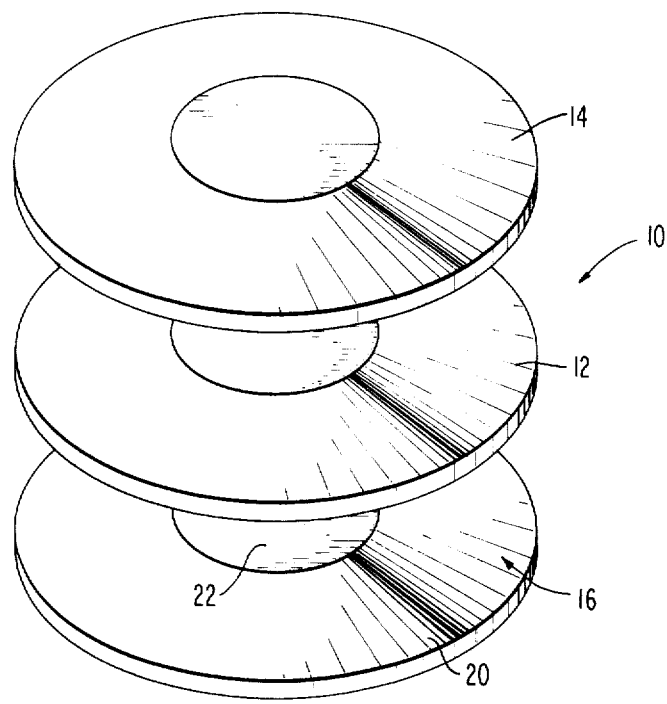
FIG. 1 is an exploded, perspective view, of a three wafer stack of the instant beverage charge of the present invention, showing the mode of varying the beverage charge formed thereby.

Reference to the drawings shows in FIG. 1 an exploded view of a three wafer beverage charge of the present invention indicated generally at 10 and comprised of a central wafer or disc 12 and outer wafers or discs 14 and 16 to each side thereof. Preferably, the central wafer 12 comprises a compressed powdered comestible, in this case coffee, which may be pure or may have additives thereto both for flavoring and adhesive purposes. In the present invention, all three wafers 12, 14 and 16 are produced by conventional processes, it being necessary that the comestibles forming all three wafers differ but be powdered and pressed into disc shape. The purpose of providing the wafers as discs is to present maximum surface area to the water for faster solubility and the configuration given to each wafer is identical regardless of which comestible it may be to insure quick and easy separation of one disc from the other which selectivity feature is one of the highlights of the present invention. For illustration purposes, while the central wafer 12 of FIG. 1 is composed of the comestible coffee, the overlying wafer 14 comprises the comestible powdered sugar, while the underlying wafer 16 comprises the comestible powdered cream.

Figure 2:
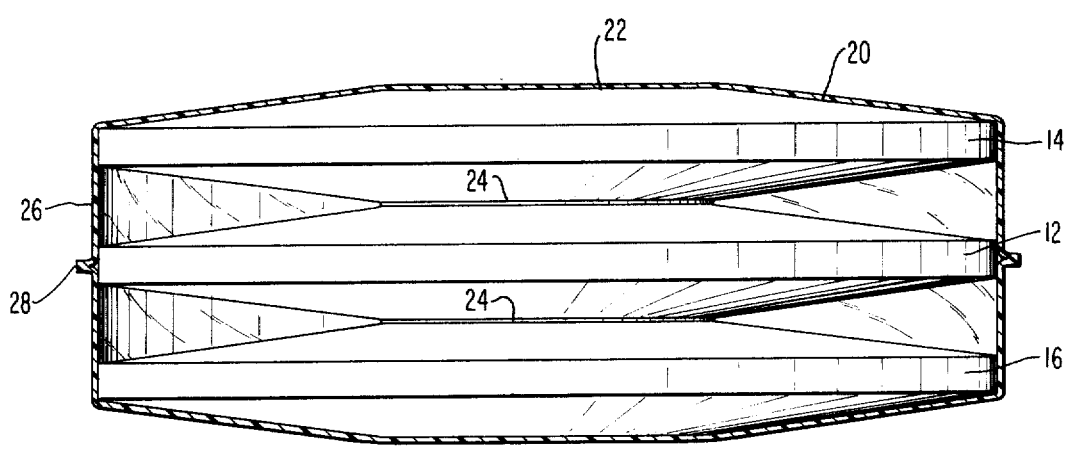
FIG. 2 is an elevational view of the instant beverage charge of FIG. 1 prior to separation of the wafers and confined within a heat sealed, water soluble film envelope.

Referring next to FIG. 2, it is noted that in each case, the wafers are disc shaped with their edges beveled or tapered at 20 to form central, circular areas 22 and tapered surfaces 20, permitting water to contact a greater surface area of each wafer of the stack to facilitate the separation of one or more wafers from the stack so that the user may readily select the combination of wafers selected to meet his taste requirements. In this respect, for instance, if the user wishes black coffee, he simply removes the upper wafer 14 and the lower wafer 16 and either saves them or throws these wafers away while dropping the middle wafer which may be formed either of coffee or tea into the cup of water. Under conventional processes, it is possible that the wafers regardless of whether the stack comprises three such wafers or more, may be mechanically affixed to each other by simply applying pressure axially of the stack with portions 22 of their surface areas moist. Preferably, however, a thin layer of a water soluble adhesive 24 which may, for instance, be a liquid sugar film as at 20, may couple the flat circular areas 22 of the wafers together after stacking. When the liquid film dries, the film acts as an adhesive to maintain the wafers stuck together until physically pulled apart during the step of preparing the beverage.

It is further noted in FIG. 2, that a sealed package is formed for the three wafer stacked charge 10 by means of a heat sealed plastic film 26 which may be applied to the stack of wafers in conventional fashion, the film in this case preferably comprising polyvinyl alcohol or other water soluble transparent material which is preferably transparent to enhance salability of the package. The film is heat sealed at 28. The heat soluble transparent cover, being water soluble, permits the sealed and protected charge consisting of a sugar, coffee and cream wafers to be dropped into a cup of boiling water to produce a cup of coffee whose taste due to the presence of the sugar and the cream meets the individual requirements of the user. The heat sealed, water soluble cover such as polyvinyl alcohol is essentially tasteless and does not materially effect the flavor of the beverage after dissolving in the water.

Rather than having the three wafer stacked charge 10 as shown, a charge may comprise only two wafers such as a combination of sugar and coffee or cream and coffee. The central wafer may be compressed powdered tea rather than coffee. Further, a large number of charges consisting of multiple wafers joined together but separable may be packaged together in cylindrical containers, and in which case, the individual charges of two or more wafers, may be packaged in the polyvinyl alcohol film if desired. Further, the polyvinyl film tends to preserve the wafers and to prevent their disintegration. Where the stacked wafers are sealed by means of the film 26, the film may be readily torn open at the heat seal areas 28 since it is quite fragile, and after removal of the film, one or both outer wafers may be removed from the central coffee or tea wafer and the selected wafer or wafers dropped into the cup of water.

While the invention has been particularly shown and described with reference to a preferred embodiment thereof, it will be understood by those skilled in the art that various changes in form and details may be made therein without departing from the spirit and scope of the invention.

What is claimed is:

1. In an "instant" water soluble, comestible beverage charge of the type wherein said charge is added to a measured body of water to form a beverage, and wherein said beverage charge comprises measured portions of separate, individual comestibles including a first comestible selected from the group consisting of powdered coffee and tea and at least one other, second comestible selected from the group consisting of powdered milk and sugar, the improvement wherein:

each comestible takes the form of a pressed powdered disc-like wafer, and said charge consisting of said first comestible wafer and at least one second comestible wafer, all of said wafers being stacked, with adjacent wafers being adhesively fixed to each other in face abutting contact and forming a unitary solid, detachable wafer stack;

whereby, the content of the beverage may be readily varied by separating a selected wafer or wafers from the stack prior to adding the stacked wafer charge to the water.

2. The instant beverage charge as claimed in claim 1, wherein said wafers comprise annular discs whose peripheral edges are beveled to provide water access to the major surface area of the stacked wafers constituting such charge and to facilitate the separation of one or more wafers from the stack and wherein the wafers are adheisively joined to each other at their centers internally of said beveled edges.

* * * * *